Dec. 17, 1929.   E. R. HEVERN   1,740,174

EMBALMER'S TROCAR

Filed Sept. 10, 1928

Inventor
Earl Ramsey Hevern
By M. Talbert Dick
Attorney

Patented Dec. 17, 1929

1,740,174

UNITED STATES PATENT OFFICE

EARL RAMSEY HEVERN, OF OXFORD, IOWA

EMBALMER'S TROCAR

Application filed September 10, 1928. Serial No. 304,995.

The principal object of my invention is to provide an embalmer's trocar that is capable of being used either for the injecting or ejecting of fluids from corpses.

A further object of this invention is to provide an embalmer's trocar that may be placed in operative communication either with the suction pump or the embalming fluid injecting mechanism by merely manually opening or closing valves.

A still further object of my invention is to provide an embalmer's trocar that may be readily and easily cleaned in case of stoppage without removal of the device from an operative position.

A still further object of my invention is to provide an embalmer's trocar that is capable of holding any one of the various trocar points now on the market.

A still further object of this invention is to provide a device to be used in the embalming of corpses that is so constructed that it is not readily clogged or fouled during its operation.

A still further object of my invention is to provide an embalmer's trocar that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

The trocars now on the market for use in the embalming of bodies are used both in the operation of removing the natural fluids from the corpse and the injecting of the preserving fluids into the body after the natural fluids have been removed. One of the disadvantages in this procedure is that much time and work is necessary for the attaching of the trocar from the suction pump to the embalming fluid injecting mechanism or vice versa. Another disadvantage of the ordinary trocar is that when it becomes stopped or fouled it is necessary to remove the pipes or tubes leading to the suction pump or the fluid injecting mechanism for cleaning. I have overcome these various disadvantages as will be appreciated by those skilled in the art.

Figure 1:
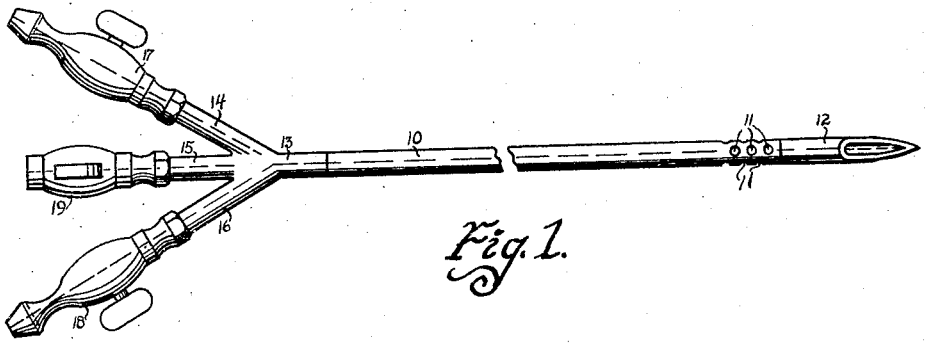
Fig. 1 is a top plan view of my complete invention ready for use.
Figure 2:
Fig. 2 is a top plan view of the plunger that is used in cleaning the trocar.
Figure 3:
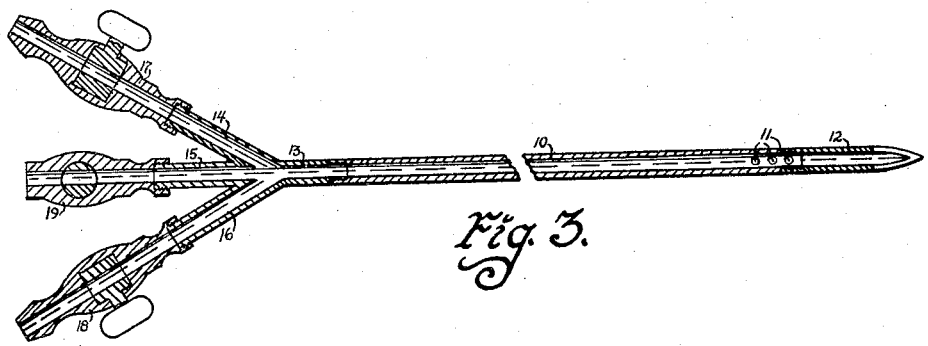
Fig. 3 is a top sectional view of my complete invention and more fully illustrates its interior construction.

I have used the numeral 10 to designate the elongated tube portion of my invention having near its forward end portion the small holes 11. This forward end is interiorly threaded to take the usual embalmer's trocar point 12. The other end is interiorly threaded to take the short pipe 13 having the three branch pipes 14, 15 and 16 extending rearwardly and communicating with the pipe 13 at a common point, as shown in Fig. 3.

Secured to the branch pipes 14 and 16 are the manually operated valves 17 and 18 each having one of their ends reduced and formed to take a rubber hose or the like (not shown) which in turn leads to a fluid injecting mechanism and suction pump also not shown. The branch pipe 15 is so placed as to be in the same plane with the inside of the elongated tube member 10 and directly communicating with the same. Threaded on to the free end of the branch pipe 16 and in direct communication with the same is the manually operated valve 19, having its rear end in communication with the outside atmosphere. When this valve 19 is in an operative position the plunger or cleaning rod 20 may be inserted into the same and forced to the extreme end of the trocar point 12, thereby clearing the same of any stoppages. Integrally formed on the plunger or cleaning rod 20 is the ring handle member 21 for facilitating the reciprocation of the plunger or cleaning rod 20 for the clearing of stoppages.

In the embalming of the human body an incision is sometimes made in the left lumbar region near the umbilical region and the trocar point is inserted where the space of the abdominal cavity and the thoracic cavity can be reached for the injecting and ejecting of fluids. When the point is entered it may become clogged in which case the fluid or gas will travel in or out of the small holes near the end of the tube. In the operation of the device we will assume that the trocar point is inserted into the corpse to be embalmed, the manually operated valve 17 is in operative communication with the suction pump and the manually operated valve 18 is in operative communication with the embalming fluid injecting mechanism. To remove the fluids and gases from the body to be embalmed it is merely necessary to close the valve 18 and open the valve 17, thereby allowing the suction pump to draw the undesirable natural fluids and gases from the body through the elongated tube 10.

After this has been accomplished the embalming fluid is injected into the body merely by closing the valve 17 and opening the valve 18, thereby allowing the embalming and preserving fluid to pass through the valve 18, into the pipe 10 and through the trocar point 12 into the body. If during either of these operations the pipes 13, 10 or point 12 becomes stopped or clogged it is merely necessary to close both the valves 17 and 18 and open the manually operated valve 19 and force the plunger or cleaning rod 20 through the valve 19, the pipe 13, the elongated pipe 10 and to the forward end of the trocar point 12, thereby eliminating the stoppage. After the obstruction has been removed the plunger 20 should be withdrawn and the valve 19 closed. It will readily be noted that all of the above operations may be performed without removing the trocar from the corpse or the detachment of either the suction pump or the fluid injecting mechanism from the same. When it is desired to eject fluids and gases from the body the manually operated valve leading to the suction pump is opened while the valve leading to the embalming fluid is closed. When injecting fluid into the body the manually operated valve leading to the suction pump is closed and the one leading to the tank containing the embalming fluid is opened. If it is desired to clear the elongated tube in case it has become clogged, it is merely necessary to open the valve 19 and insert the cleaning rod 20.

Some changes may be made in the construction and arrangement of my improved embalmer's trocar without departing from the real spirit and purpose of my invention and it is my intention to cover by my claims any modified forms of structure of use of mechanical equivalents which may be reasonably included within their scope.

I claim:

1. In a device of the class described, an elongated tube having ports near one of its ends, a trocar point secured to the end of said elongated tube having said ports, a pipe secured to the other end of said tube, three branch pipes integrally formed on and communicating with the free end of said pipe; one of said branch pipes having its bore in a plane with the bore of said tube, a valve secured to the free end of said branch pipe having a bore in the same plane as the bore of said tube, a manually operated valve secured to the free ends of each of the remaining branch pipes and a nipple integrally formed on each of the two last mentioned valves designed to each receive one end of a hose.

2. In a device of the class described, an elongated tube, a trocar point secured to the one end of said elongated tube, a pipe secured to the other end of said tube, three branch pipes integrally formed on and communicating with the free end of said pipe; one of said branch pipes having its bore in a plane with the bore of said tube, a valve secured to the free end of said branch pipe having a bore in the same plane as the bore of said tube, and a manually operated valve secured to the free ends of each of the remaining branch pipes.

3. In a device of the class described, an elongated tube, a trocar point detachably secured to one end of said elongated tube, a pipe secured to the other end of said tube, a branch pipe integrally formed and communicating with the free end of said pipe, a valve secured to the free end of the pipe secured to said tube; said valve having a bore in the same plane as the bore of said pipe and tube, and a manually operated valve secured to the free end of said branch pipe.

4. In a device of the class described, an elongated tube, a trocar point detachably secured to one end of said elongated tube, a pipe secured to the other end of said tube, a branch pipe integrally formed and communicating with the free end of said pipe, a valve secured to the free end of the pipe secured to said tube; said valve having a bore in the same plane as the bore of said pipe and tube, and a nipple formed on the last mentioned valve designed to receive the end of a hose.

5. In a device of the class described, an elongated tube, a trocar point on one end of said elongated tube, a pipe secured to the other end of said tube, three branch pipes integrally formed on and communicating with the free end of said pipe; one of said branch pipes having its bore in a plane with the bore of said tube, a valve secured to the free end of said branch pipe having a bore in the same plane as the bore of said tube, a plunger capable of being forced through said pipe and tube when said valve is open, a manually operated valve secured to the free ends of each of the remaining branch pipes, and a nipple integrally formed on each of the two last mentioned valves designed to each receive one end of the hose.

EARL RAMSEY HEVERN.